United States Patent
Bellinger et al.

(10) Patent No.: US 12,038,052 B2
(45) Date of Patent: Jul. 16, 2024

(54) APPARATUSES, METHODS, SYSTEMS, AND TECHNIQUES FOR IMPROVING THE ACCURACY OF INTERNAL COMBUSTION ENGINE TORQUE DETERMINATIONS

(71) Applicant: Cummins Inc., Columbus, IN (US)

(72) Inventors: Steven M. Bellinger, Columbus, IN (US); Vasudev S. Karve, Columbus, IN (US); Ajinkya A. Gujar, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/813,612

(22) Filed: Jul. 20, 2022

(65) Prior Publication Data

US 2022/0356914 A1  Nov. 10, 2022

Related U.S. Application Data

(63) Continuation of application No. PCT/US2021/013908, filed on Jan. 19, 2021.

(60) Provisional application No. 62/968,288, filed on Jan. 31, 2020.

(51) Int. Cl.
*F16D 48/06* (2006.01)
*F02D 41/00* (2006.01)
*F02D 41/14* (2006.01)

(52) U.S. Cl.
CPC ......... *F16D 48/06* (2013.01); *F02D 41/0052* (2013.01); *F02D 2041/1432* (2013.01); *F02D 2200/1004* (2013.01); *F02D 2200/1006* (2013.01); *F16D 2500/104* (2013.01); *F16D 2500/3062* (2013.01); *F16D 2500/3063* (2013.01); *F16D 2500/3064* (2013.01); *F16D 2500/3065* (2013.01); *F16D 2500/3067* (2013.01)

(58) Field of Classification Search
CPC ....... F16D 2500/104; F16D 2500/3067; F02D 2041/1432; F02D 2041/1433; F02D 2200/0618; F02D 41/0052; F02D 41/1497; F02D 2200/1012
See application file for complete search history.

(56) References Cited

U.S. PATENT DOCUMENTS

| | | | |
|---|---|---|---|
| 6,584,391 B2 | 6/2003 | Lack | |
| 6,687,598 B2 | 2/2004 | Oota et al. | |
| 7,289,899 B2 | 10/2007 | Rodriguez et al. | |
| 7,389,682 B2 | 6/2008 | JaVaherian | |
| 7,623,955 B1 | 11/2009 | Rackmil et al. | |

(Continued)

FOREIGN PATENT DOCUMENTS

| | | |
|---|---|---|
| DE | 102012203669 | 9/2012 |
| DE | 102013200310 | 7/2013 |

*Primary Examiner* — John Kwon
(74) *Attorney, Agent, or Firm* — Taft, Stettinius & Hollister LLP (57) ABSTRACT

A system comprises a powertrain including an engine configured to output torque to a driveline, and an electronic control system operatively coupled with the powertrain. The electronic control system is configured to determine an engine torque value, and control a component of the driveline in response to the engine torque value. The engine torque value may account for an effect of air-fuel ratio (AFR) on engine torque. The engine torque value may account for an effect of charge transport delay on engine torque.

20 Claims, 6 Drawing Sheets

(56) References Cited

U.S. PATENT DOCUMENTS

| | | | |
|---|---|---|---|
| 7,844,404 B2 | 11/2010 | Ling et al. | |
| 8,401,764 B2 | 3/2013 | Jentz et al. | |
| 8,515,648 B2 | 8/2013 | Satoshi et al. | |
| 9,840,974 B2 | 12/2017 | Lockwood et al. | |
| 10,358,140 B2* | 7/2019 | Livshiz | B60W 10/10 |
| 11,618,433 B1* | 4/2023 | Lee | B60K 6/547 |
| | | | 477/3 |
| 2011/0172933 A1 | 7/2011 | Winkel | |
| 2016/0115892 A1* | 4/2016 | Tanaka | F02D 41/307 |
| | | | 123/406.46 |
| 2016/0153373 A1* | 6/2016 | Yoshizaki | F02D 13/02 |
| | | | 123/406.48 |

* cited by examiner

| X/Y | -21 | -3 | 3 | Engine Acceleration(rad/sec) | | | | |
|---|---|---|---|---|---|---|---|---|
| | | | | 10 | 31 | 79 | 105 | 419 |
| 10 | 75 | 0 | 0 | -175 | -275 | -275 | -300 | -300 |
| 12 | 75 | 0 | 0 | -175 | -275 | -275 | -300 | -300 |
| 14 | 75 | 0 | 0 | -150 | -250 | -250 | -250 | -250 |
| 15 | 75 | 0 | 0 | -100 | -100 | -175 | -175 | -250 |
| 16 | 75 | 0 | 0 | -100 | -100 | -175 | -175 | -250 |
| 17 | 75 | 0 | 0 | -100 | -100 | -100 | -100 | -200 |
| 18 | 0 | 0 | 0 | -50 | -50 | -50 | -75 | -75 |
| 20 | 0 | 0 | 0 | -50 | -50 | -50 | -50 | -50 |
| 22 | 0 | 0 | 0 | -25 | -25 | -50 | -50 | -50 |
| 24 | 0 | 0 | 0 | 0 | 0 | -50 | -50 | -50 |
| 26 | 0 | 0 | 0 | 0 | 0 | -50 | -50 | -50 |
| 28 | 0 | 0 | 0 | 0 | 0 | 0 | 0 | 0 |

AFR Axis ial combustion engine torque determinations and the accuracy of broadcast engine torque values. A number of proposals have been made for determining internal combustion engine torque. Existing proposals suffer from a number of drawbacks and shortcomings including those respecting accuracy, reliability, and transient engine operation. There remains a significant unmet need for the unique apparatuses, methods, systems, and techniques disclosed herein.

APPARATUSES, METHODS, SYSTEMS, AND TECHNIQUES FOR IMPROVING THE ACCURACY OF INTERNAL COMBUSTION ENGINE TORQUE DETERMINATIONS

CROSS-REFERENCE

The present application is a continuation of PCT Application No. PCT/US21/13908 filed on Jan. 19, 2021, which claims priority to and the benefit of U.S. Application No. 62/968,288 filed Jan. 31, 2020, the disclosures of which are hereby incorporated by reference.

BACKGROUND

The present disclosure relates to apparatuses, methods, systems, and techniques for improving the accuracy of internal combustion engine torque determinations and the accuracy of broadcast engine torque values. A number of proposals have been made for determining internal combustion engine torque. Existing proposals suffer from a number of drawbacks and shortcomings including those respecting accuracy, reliability, and transient engine operation. There remains a significant unmet need for the unique apparatuses, methods, systems, and techniques disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created and that the invention includes and protects such alterations, modifications, and further applications of the example embodiments as would occur to one skilled in the art.

SUMMARY OF THE DISCLOSURE

One embodiment is a unique system for improving the accuracy of internal combustion engine torque determinations. Other embodiments include apparatuses, methods, and techniques for improving the accuracy of internal combustion engine torque determinations. Further embodiments, forms, objects, features, advantages, aspects, and benefits shall become apparent from the following description and drawings.

DETAILED DESCRIPTION OF EXAMPLE EMBODIMENTS

Figure 1:
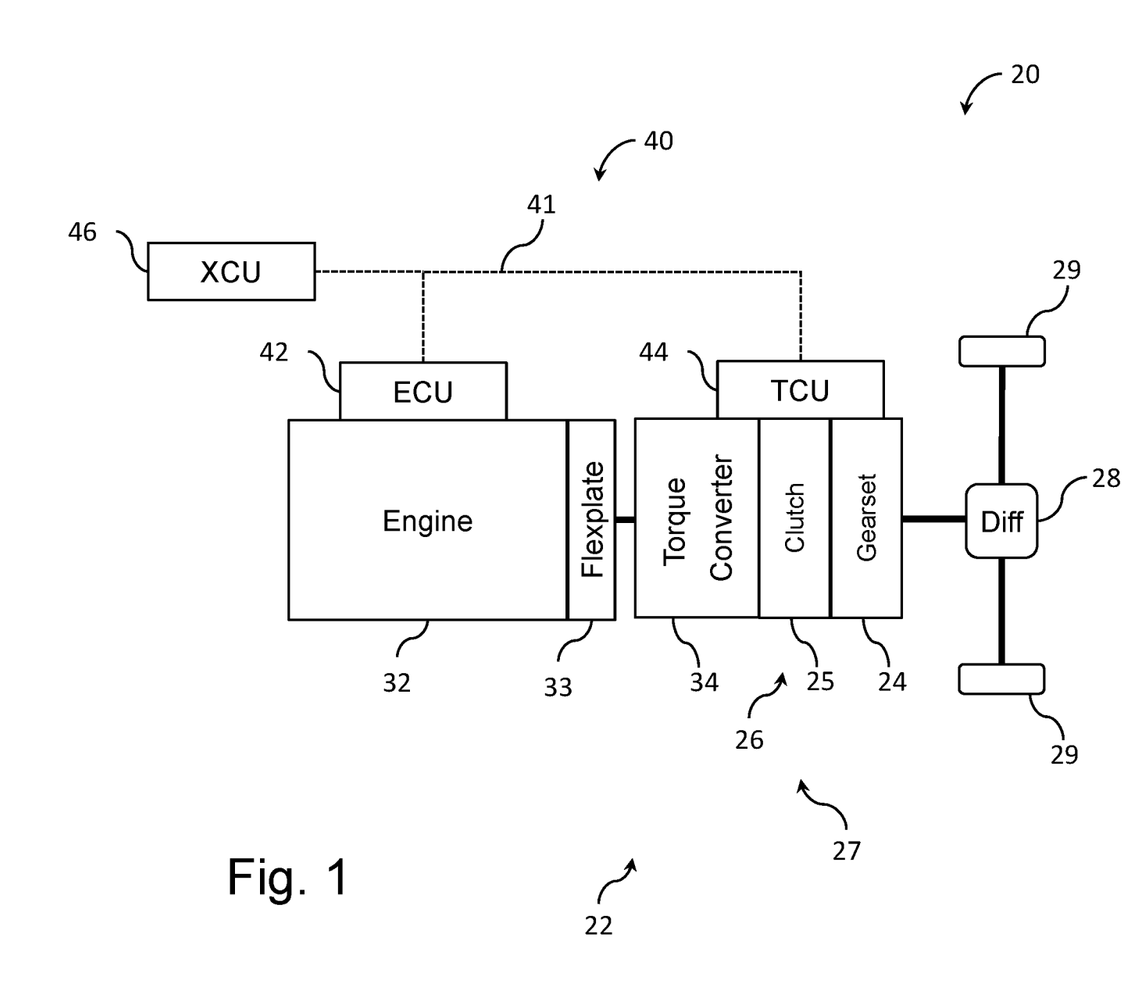
FIG. 1 is a schematic diagram illustrating certain aspects of an example vehicle system.

With reference to FIG. 1, there is illustrated, an example vehicle system 20. In the illustrated embodiment, vehicle system 20 includes a powertrain 22 comprising an internal combustion engine 32, a flexplate 33, a transmission 26, a differential 28, and ground engaging wheels 29. It shall be appreciated that flexplate 33, transmission 26, differential 28, and ground engaging wheels 29 may be considered components of a driveline 27 which is operatively coupled with an output shaft of engine 32. In the illustrated embodiment, the vehicle system 20 is propelled by ground engaging wheels 29 which are provided as rear wheels; however, in other embodiments, front-wheel drive, four-wheel drive, and all-wheel drive approaches are contemplated. In one form, vehicle system 20 is a form of on-road bus, delivery truck, a service truck, or the like. In other forms, vehicle system 20 may be a different type of vehicle, including other types of on-road or off-road vehicles. In still other embodiments vehicle system 20 may be a marine vehicle (boat/ship) or another type of vehicle. In yet other embodiments, rather than a being provided in a vehicle system, powertrain 22 is applied to other applications and systems, such as an engine-driven generator (a gen-set), a pumping system, or another powertrain system.

Powertrain 22 includes an internal combustion engine 32 which is operatively coupled with and configured to provide torque to a flexplate 33 which may alternatively be provided as a flywheel. Flexplate 33 is operatively coupled with and configured to provide torque to a transmission 26. In the illustrated embodiment, flexplate 33 is configured to provide torque to torque converter 34 of transmission 26, it being appreciated that other embodiments may not include a torque converter and flexplate 33 (or a flywheel) may be coupled with other components of transmission 26. Torque converter 34 is operatively coupled with and configured to provide torque to clutch 25 which is, in turn, operatively coupled with and configured to provide torque to gear set 24 which may be configured as gearbox (e.g., if transmission 26 is configured as a manual transmission or an automated manual transmission), a planetary gear set (e.g., if transmission 26 is configured as an automatic transmission) or as belts or other non-gear forms (e.g., if transmission 26 is configured as continuously variable transmission). Gear set 24 is operatively coupled with and configured to provide torque to differential 28 which is, in turn, operatively coupled with and configured to provide torque to ground engaging wheels 29 which, in other embodiments, may be provided as wheels, treads, tracks, or other ground-contacting members. In some embodiments ground engaging wheels 29 may alternatively be configured as other load engaging members (e.g., propellers or an electrical machine).

In the illustrated embodiment, engine 32 is configured as a turbocharged, compression ignition diesel engine, it being appreciated that engine 32 may be provided as another type of engine in other embodiments. In the illustrated embodiment, powertrain 22 is powered only by engine 32. In other embodiments, powertrain 22 may be provided with torque from additional components such as an electric motor operatively coupled with a battery or other energy storage system (e.g., in embodiments where the powertrain is configured as a hybrid powertrain), one or more vehicle accessories or other power providing component.

Vehicle system 20 includes an electronic control system (ECS) 40 which includes an engine control unit (ECU) 42, a transmission control unit (TCU) 44, and may also include one or more additional control units (XCU) 46. ECU 42, TCE 44, and XCU 46 (where present) are operatively coupled with and configured for communication over a network 41 which may be configured as a controller area network (CAN) or another type of network providing communication capabilities. ECS 40 is also operatively coupled with various components and systems of the vehicle system 20 via network 41 or one or more additional or alternative networks.

In the illustrated embodiment, ECS 40 includes a plurality of programmable microprocessors or microcontrollers of a solid-state, integrated circuit type which are provided in a plurality of control units. ECS 40 can be implemented in any of a number of ways that combine or distribute the control function across one or more control units in various manners. ECS 40 executes operating logic that defines various control, management, and/or regulation functions. This operating logic may be in the form of dedicated hardware, such as a hardwired state machine, analog calculating machine, programming instructions, and/or a different form as would occur to those skilled in the art. ECS 40 may be provided as a single component or a collection of operatively coupled components; and may be comprised of digital circuitry, analog circuitry, or a hybrid combination of both of these types. When of a multi-component form, ECS 40 may have one or more components remotely located relative to the others in a distributed arrangement. ECS 40 can include multiple processing units arranged to operate independently, in a pipeline processing arrangement, in a parallel processing arrangement, or the like. It shall be further appreciated that ECS 40 and/or any of its constituent components may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or components as would occur to those skilled in the art to perform the desired communications.

Vehicle system 20 is an example of a system including a powertrain including an engine configured to output torque to a driveline, and an electronic control system operatively coupled with the powertrain and configured to determine an engine torque value accounting for an effect of air-fuel ratio (AFR) on engine torque and an effect of engine acceleration on AFR and to control a driveline component such as a clutch in response to the engine torque value. In certain embodiments, vehicle system 20 may be so configured using one or more aspects of the controls described in connection with FIGS. 2-5.

Vehicle system 20 is also an example of a system including an engine configured to output torque to a driveline, and an electronic control system operatively coupled with the powertrain and configured to determine an engine torque value accounting for an effect of transport delay (e.g., delay associated with transport of intake or charge air also referred to as intake transport delay or charge transport delay) based on the rate of change in commanded engine fueling and engine speed to control a driveline component such as a clutch in response to the engine torque value. In certain embodiments, vehicle system 20 may be so configured using one or more aspects of the controls described in connection with FIGS. 2-5.

Vehicle system 20 is additionally an example of a system including a powertrain including an engine configured to output torque to a driveline, and an electronic control system operatively coupled with the powertrain and configured to determine an engine torque value accounting for an effect of engine inertia and to control a driveline component such as a clutch in response to the engine torque value. In certain embodiments, vehicle system 20 may be so configured using one or more aspects of the controls described in connection with FIGS. 2-5.

Figure 2:
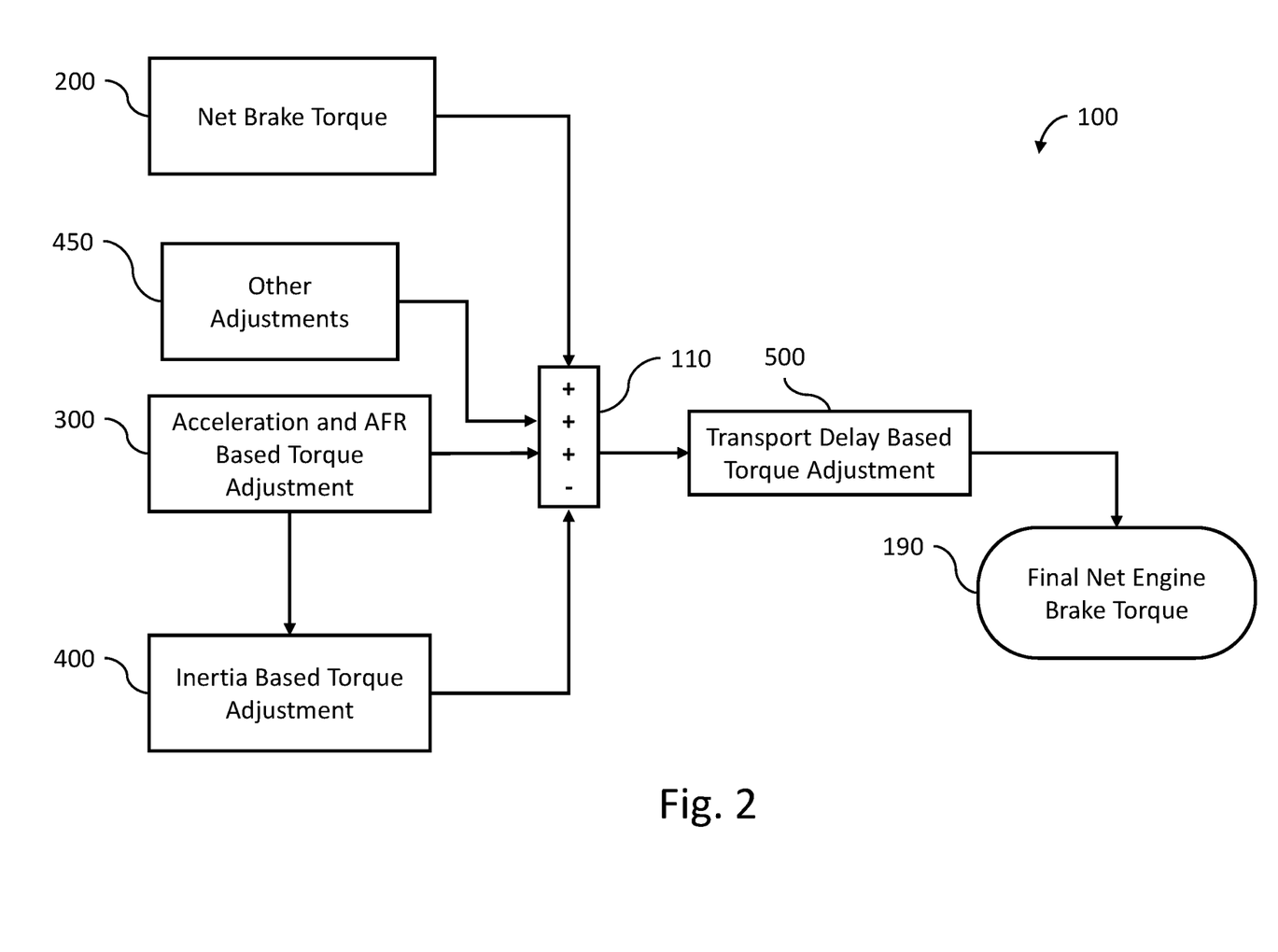
FIG. 2 is a schematic diagram illustrating certain aspects of example controls for a vehicle system.

With reference to FIG. 2, there are illustrated example controls 100 which may be implemented in one or more components of an electronic control system such as ECS 40 of system 20 or another electronic control system operatively coupled with a powertrain including an engine. Controls 100 may, for example, be implemented in one or more integrated-circuit based (e.g., microprocessor-based or microcontroller-based) electronic control units such as ECU 42 or one or more other electronic control units.

Controls 100 include a steady state engine torque value determination block 200 (also referred to as block 200), an air-fuel ratio (AFR) adjustment determination block 300 (also referred to as block 300), a powertrain inertia adjustment determination block 400 (also referred to as block 500), and a transport delay determination block 500 (also referred to as block 500). Controls 100 may also include one or more additional adjustment blocks 450 (also referred to as block 450). Block 200, block 300, block 400, and block 450 are configured to provide outputs indicating torque values or adjustments to torque values to summing operator 110 which adds the inputs received from block 200, block 300, and block 450 and subtracts the input received from block 400 and outputs the resulting sum to block 500. Block 300 may also provide certain outputs to block 400 as described below block 500 output an engine torque value 190. It shall be appreciated that one or more of blocks 300, 400, 450, and 500 may be omitted in certain embodiments while still providing an adjusted engine torque value provided that at least one or more of blocks 300, 400, 450, and 500 is present.

In certain example embodiments, block 450 (or one or more additional or alternative blocks) may be configured to determine additional adjustment factors for engine systems such as natural gas or dual-fuel engine systems wherein fuel is introduced to the intake system and mixed with intake air at a location upstream from the cylinders (e.g., upstream of a compressor, between a compressor and an intake manifold, at the intake manifold, at a cylinder port, or at another location of a conduit or manifold of an intake system upstream from the cylinders.) Some such systems are configured and controller to run at an AFR close to stoichiometric. Furthermore, in some such engine systems, the volume of the air-fuel charge mixture can equal one full displacement of the engine or may be greater or lesser but a non-trivial fraction of the engine displacement. After a throttle is closed, the high air/fuel charge residing in the intake manifold and/or other intake system components must be consumed before engine torque begins to drop. Similarly, when transitioning from a closed to an open or wide-open throttle condition, the intake manifold must be charged with the higher air/fuel quantities before the higher torque is achieved.

To account for the foregoing and similar effects, block 450 (or one or more additional or alternative blocks) may determine adjustments accounting for a volume or quantity of air-fuel charge mixture transport delay associated with such engines. Such techniques may account for the charge mixture currently in the intake manifold relative to what is needed to coincide with the new throttle pedal position. Such transport delay factors may utilize similar techniques as the other transport delay adjustment techniques disclosed herein but may be additionally or alternatively configured to account for the transport delay associated with the filling and emptying of the volume of charge mixture upstream of the cylinders. Techniques accounting for such transport delay factors may account for the pumping volume associated with the engine displacement, the volume of the intake system containing an air-fuel charge mixture, and the number of cycles corresponding to the filling and emptying of the volume, as well as for variation in the air-fuel charge mixture during the filling and emptying of this volume, for example, due to variation in commanded fueling and its effect on the air-fuel charge mixture.

Engine torque value 190 is an example of an adjusted engine torque value accounting for the determinations and outputs of blocks 200, 300, 400, 450 and 500. In certain embodiments engine torque value 190 may be a net brake torque value indicating torque at a defined driveline location such as an interface between the engine and a transmission component (e.g., torque at the input side of a transmission clutch). Engine torque value 190 may be provided to components of an electronic control system to control one or more components of the driveline in response to the engine torque value. For example, engine torque value 190 may be provided to a transmission control component such as TCU 44, for example, by broadcasting engine torque value 190 over network 41 or otherwise providing it to a transmission control component of an electronic control system. The transmission control component may use the engine torque value to control shifting operations such as clutch pressures during transmission shifting events. The accuracy of engine torque value 190 can affect a transmission performance such as target shift quality and transmission durability. Engine torque value 190 may be provided to one or more components of an electronic control system to control one or more additional or alternative components of the driveline in response to the engine torque value, for example, powertrain control features such as traction control devices and systems, stability control devices and systems, vehicle-level control systems and features such as adaptive and/or predictive cruise control systems (e.g., smart cruise), automated vehicle control systems and features, autonomous vehicle control systems and features, and other control systems and features whose operation is responsive to engine torque.

Block 200 is configured to determine a predicted engine torque value for steady state engine operation. Block 200 may be configured to perform this determination in response to a number of inputs indicating engine operating parameters, for example, a fueling input (e.g., a commanded fueling) and a charge flow input (e.g., a predicted charge flow) using a number of techniques as would occur to one of skill in the art with the benefit of the present disclosure.

Block 300 is configured to account for an effect of air-fuel ratio (AFR) on engine torque as well as for an effect of engine acceleration on AFR. As further illustrated in FIG. 3, block 300 includes an AFR torque adjust operator 330 (also referred to as operator 330). In the illustrated embodiment, operator 330 is configured as a three-dimensional lookup table (LUT). In other embodiments, operator 330 may be provided in other forms including, for example, logic configured to perform real-time calculations, gate arrays, or other forms. Operator 330 is an example of a control component configured to determine an AFR adjustment value in response to one or more input values indicating engine acceleration and AFR. Operator 330 may be configured to determine an AFR adjustment value in response to inputs indicating an engine AFR and an engine acceleration (sometimes referred to as an engine speed rate of change or by an abbreviation such as "Ndot").

Figure 3:
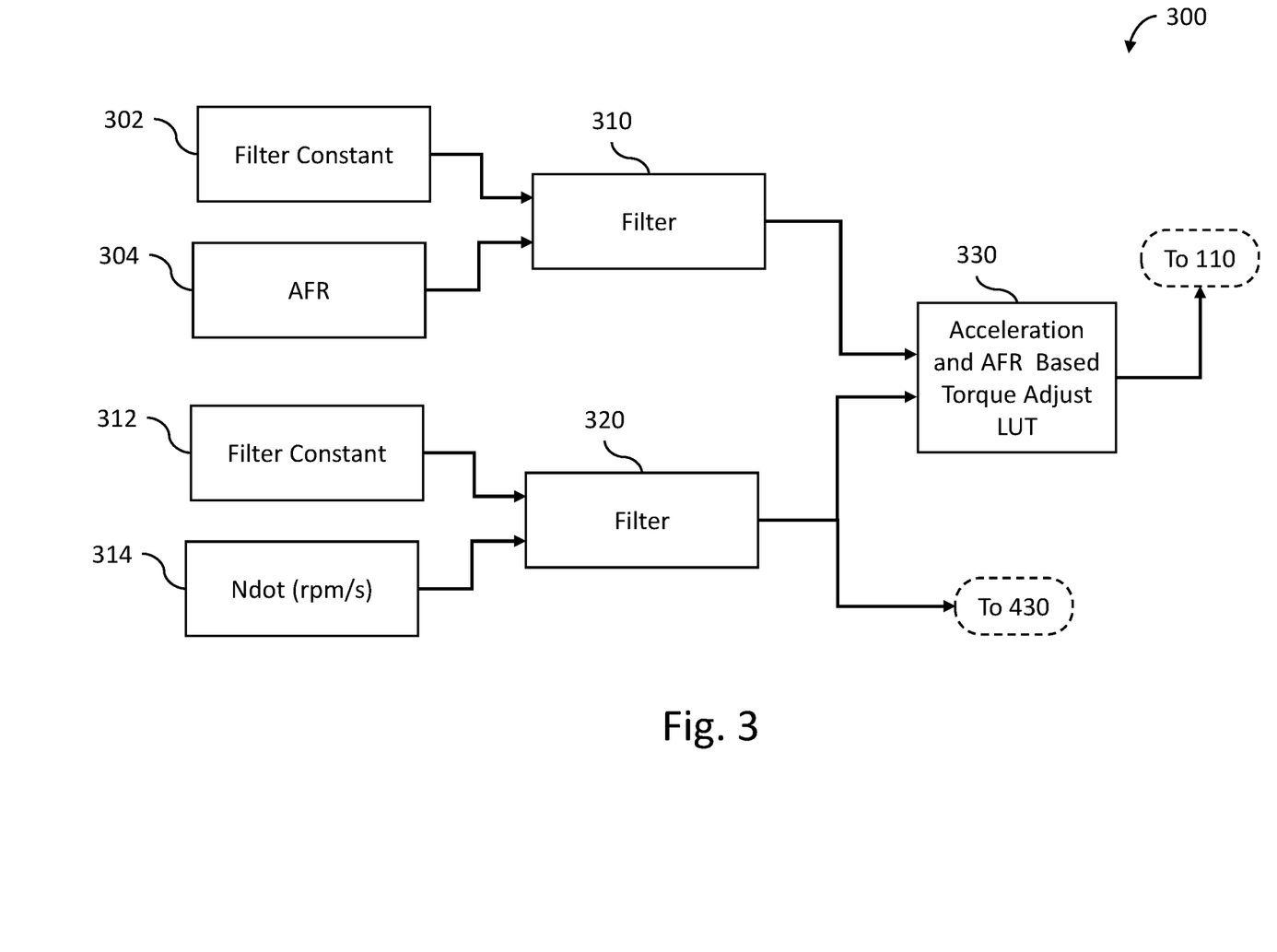
FIG. 3 is a schematic diagram illustrating certain aspects of example controls for a vehicle system.

Block 300 includes AFR determination operator 304 (also referred to as operator 304) which is configured to predict the current air-fuel ratio of the engine. Operator 304 may be configured to predict the current air-fuel ratio of the engine in response to inputs indicating a commanded fueling and a charge flow rate (e.g., a charge mass flow rate) which is also sometimes referred to as an intake flow rate. Commanded fueling inputs may, in turn, be determined in response to operator torque demands or other system torque demands. Charge flow rate may be determined in response to inputs such as intake manifold pressure, and intake manifold temperature. On other forms, additional or alternate intake pressures and temperatures may be utilized.

The output of operator 304 is provided to a filter 310 which is also provided with a filter constant 302. In the illustrated embodiment filter 310 is a first-order filter such as a first-order noise filter. Filter constant 302 may be a calibratible or configurable parameter which may be set to tune filter 310 for desired performance including signal noise reduction and attenuation. Filter 310 is configured to mitigate signal noise in the input received from operator 304 and to provide a filtered output to operator 330.

Block 300 includes acceleration determination operator 314 (also referred to as operator 314) which is configured to determine an acceleration of the engine. Operator 314 may be configured to determine an acceleration of the engine in response to a change in engine speed over time (rpm/s).

The output of operator 314 is provided to a filter 320 which is also provided with a filter constant 312. In the illustrated embodiment filter 320 is a first-order filter such as a first-order noise filter. Filter constant 312 may be a calibratible or configurable parameter which may be set to tune filter 320 for desired performance including signal noise reduction and attenuation. Filter 320 is configured to mitigate signal noise in the input received from operator 314 and to provide a filtered output to operator 330. The output of filter 320 is also provided to operator 430 which is described in connection with FIG. 4.

Operator 330 receives an input indicating engine AFR from filter 310 and an input indicating engine acceleration from filter 320 and in response to these inputs determines an AFR adjustment value which operator 330 provides the AFR adjustment value to operator 110. When configured as a lookup table, the output values corresponding to different input ranges may set to empirically determined values. The magnitude of the AFR adjustment value may be positively correlated with engine acceleration. For example, the effect of AFR on engine torque determinations may be relatively small for lower acceleration rates but relatively large for higher acceleration rates. Thus, operator 330 may be configured to provide an AFR adjustment value that is greater for higher rates of acceleration and lower for lower rates of acceleration. The magnitude of the AFR adjustment value may also be positively correlated with engine load. For example, the effect of AFR on engine torque determinations may be relatively smaller for lower engine load transient conditions and relatively greater for higher load transient conditions. Thus, operator 330 may be configured to provide an AFR adjustment value that is greater for higher rates of change in engine speed and lower for lower rates of change in engine speed. By accounting for an effect of air-fuel ratio (AFR) on engine torque and an effect of engine acceleration on AFR the output of operator 330 improves the accuracy of engine torque value 190 during transient operation of the engine such as during acceleration.

Block 400 is configured to account for an effect of powertrain inertia on engine torque. As further illustrated in FIG. 4, block 400 includes a summing operator 420 (also referred to as operator 420) which receives inertia parameters for one or more powertrain components on the engine side of a defined system reference point (e.g., the torque input to a transmission clutch) and outputs a net powertrain inertia value. In the illustrated embodiment, a plurality of inertia parameters are provided to operator 420 for powertrain components include engine inertia 410, flexplate inertia 412, and torque converter impelled inertia 414. Other embodiments may account for and provide other inertia parameters, for example, flywheel inertia (e.g., where a flywheel is present instead of a flexplate) or may omit certain parameter (e.g., torque converter impelled inertia 414 where a torque converter is not present).

Figure 4:
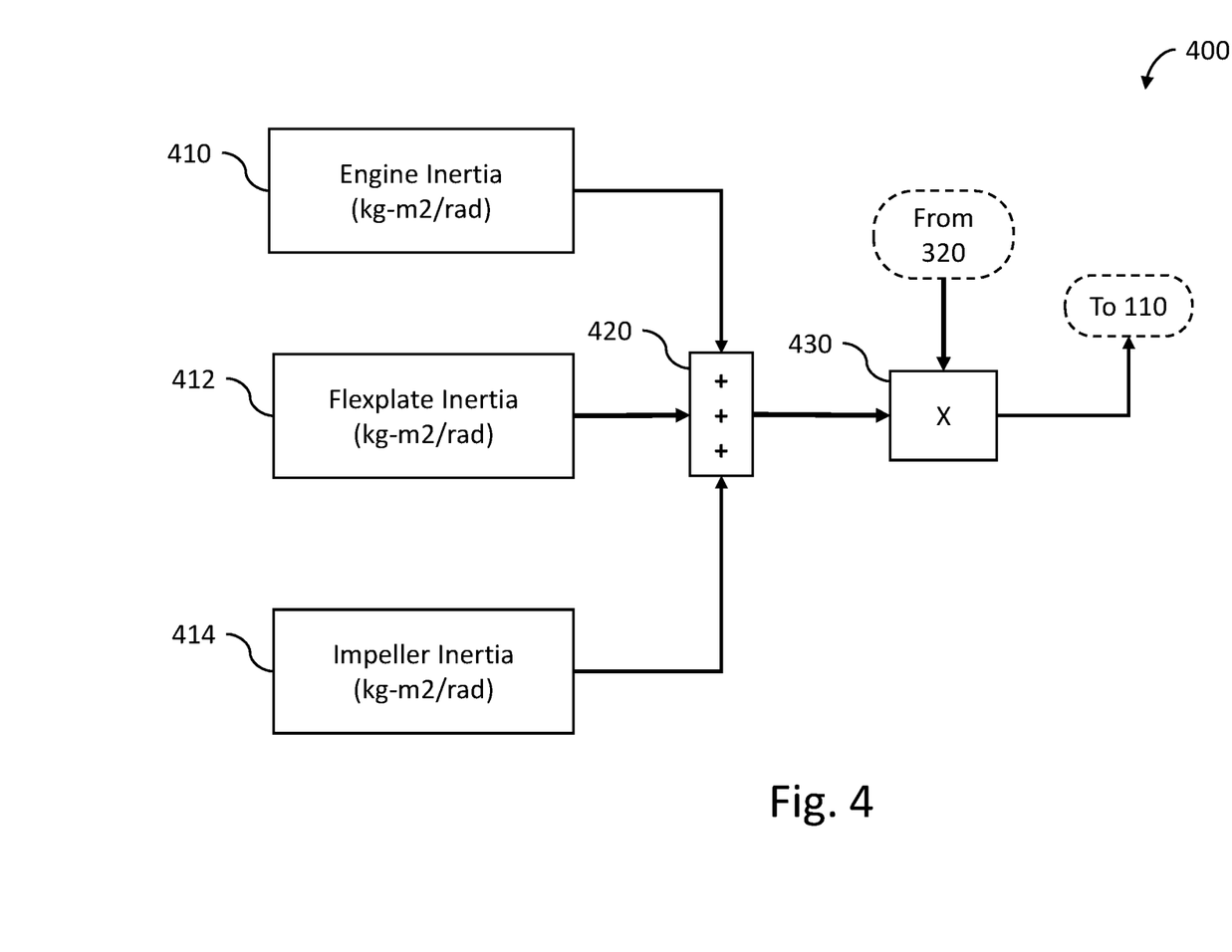
FIG. 4 is a schematic diagram illustrating certain aspects of example controls for a vehicle system.

The net powertrain inertia value output from operator 420 is provided to operator 430 which also receives an indication of engine acceleration from filter 320. Operator 430 determines the multiplicative product of its inputs and provides this product to operator 110 which adds the inputs received from block 200, block 300, and block 450 and subtracts the input received from block 400 and outputs the resulting sum to block 500.

Block 450 is configured to account for one or more additional effects on engine torque. For example, block 450 may be configured to an effect of pumping torque losses and an effect of an engine temperature (e.g., oil temperature and/or coolant temperature) on pumping torque losses. Additionally or alternatively, block 450 may be configured to account for an effect of one or more engine accessories or components, such as one or more fans, compressors, pumps, alternators, or other mechanical, hydraulic, pneumatic, electrical loads. Furthermore, it shall be appreciated that block 450 may comprise separate blocks accounting for two or more of the foregoing or other additional losses or loads may be provided in certain embodiments. Block 450 may include one or more operators configured to determine one or more adjustment values accounting for one or more of the foregoing effects. Such operators may be configured as lookup tables (LUT) or may be provided in other forms including, for example, logic configured to perform real-time calculations, gate arrays, or other forms. Such operators may be configured according to empirical observations of the respective effects on engine torque or using other techniques as will occur to one of skill in the art with the benefit of the present disclosure.

Block 500 is configured to account for an effect of charge transport delay on engine torque. As further illustrated in FIG. 5, block 500 includes a filter 510 which receives the output of operator 110 and also receives a filter constant from filter constant determination filter 510 (also referred to as filter 510). In the illustrated embodiment filter 510 is a noise filter. Filter 510 is configured to account for an effect of charge transport delay on engine torque and to determine and output engine torque value 190.

Figure 5:
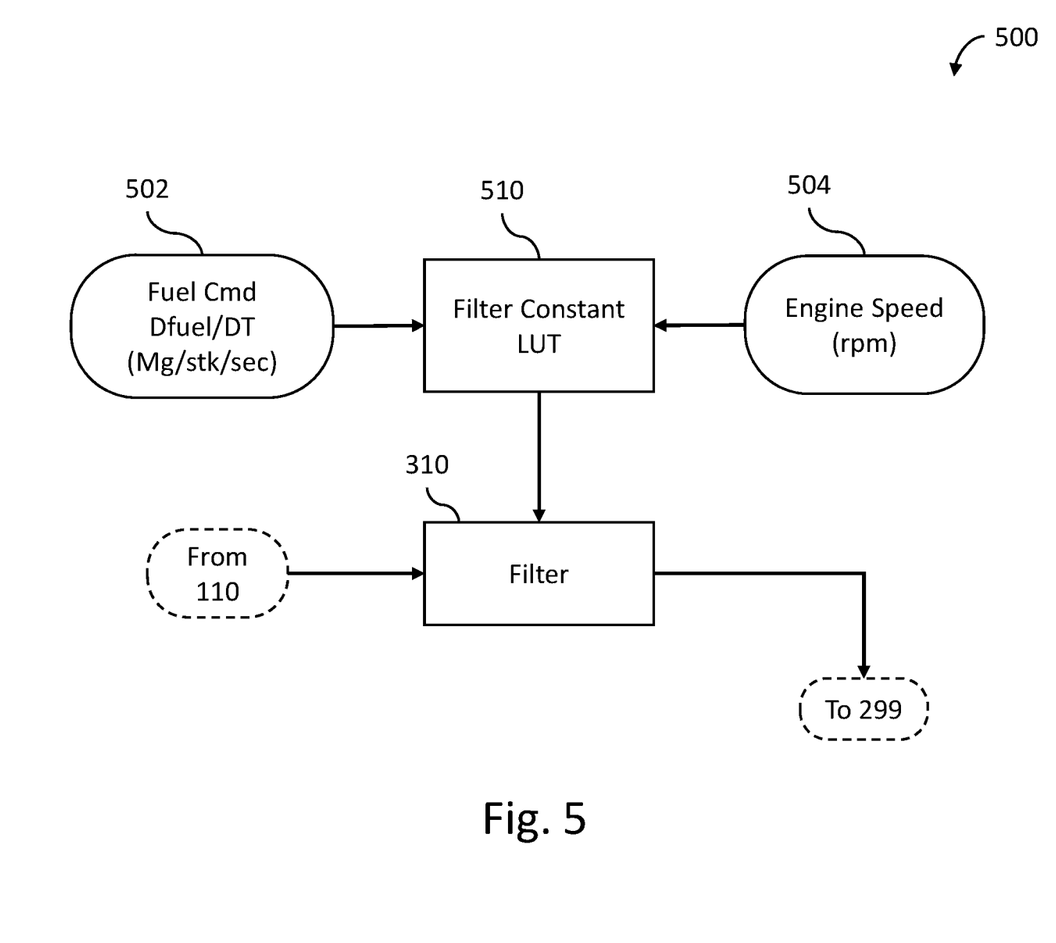
FIG. 5 is a schematic diagram illustrating certain aspects of example controls for a vehicle system.
Figure 6:
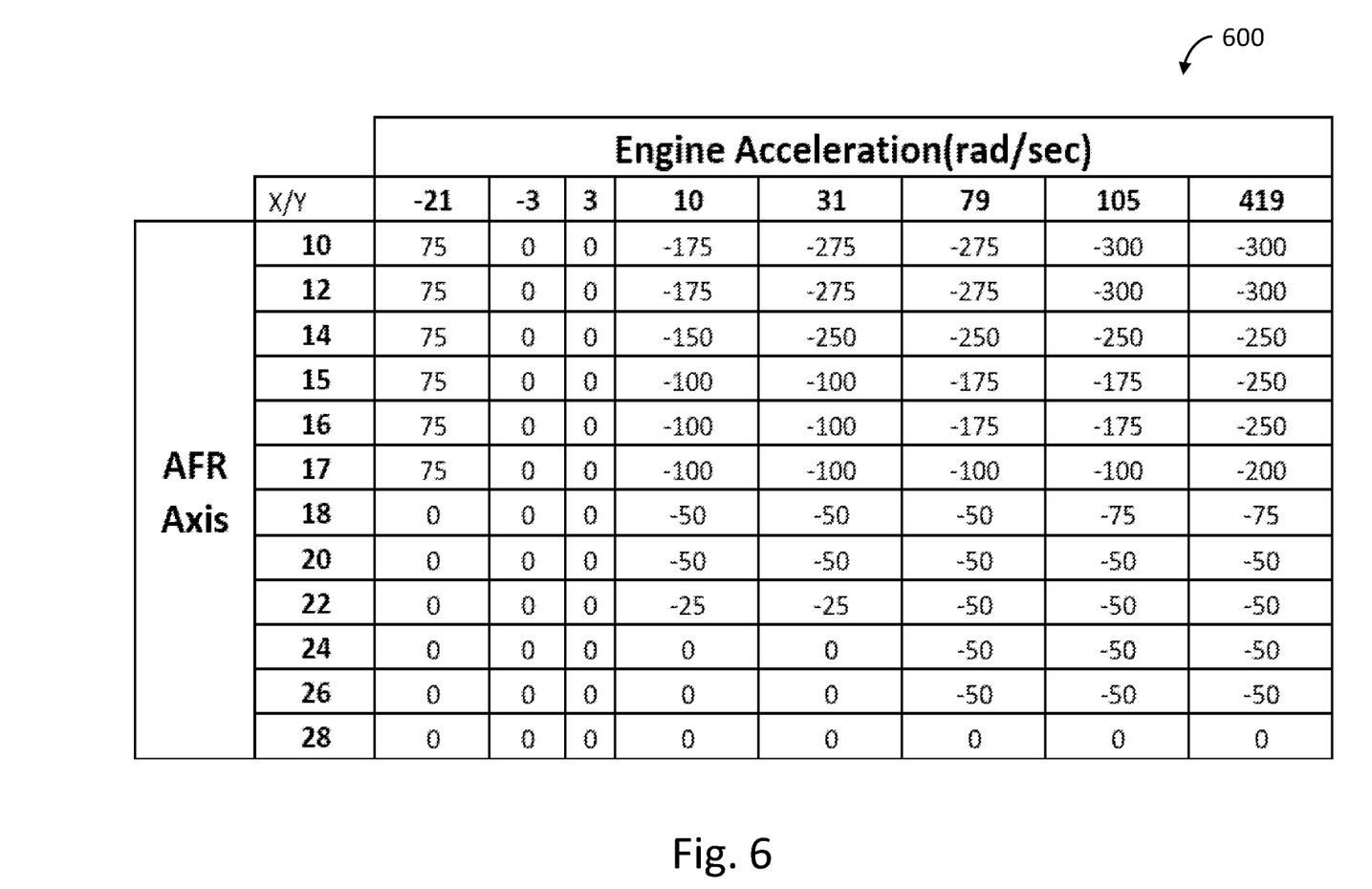
FIG. 6 is a schematic diagram illustrating certain aspects of an example lookup table.

In the illustrated embodiment, filter 310 is configured as a two-dimensional LUT. An example LUT 600 according to which filter 310 may be configured is illustrated in FIG. 6. LUT 600 includes an engine acceleration (rad/s) axis which can be specified based on an engine acceleration input, an AFR axis which can be specified based on an AFR input and is populated with adjustment values corresponding to various combinations of the engine acceleration axis and the AFR axis which may be selected as outputs in response to corresponding inputs. In other embodiments, filter 510 may be provided in other forms including, for example, logic configured to perform real-time calculations, gate arrays, or other forms. Filter 510 receives a fueling rate of change parameter 502 and an engine speed parameter 504 as inputs and in response determines and outputs a filter constant to filter 310 configured to account for an effect of transport delay on engine torque which may be based on engine speed and fueling rate of change.

The disclosed controls include a number of elements referred to as a block, an operator, a filter, or like terms. It shall be appreciated that such terms connote structural features that may be configured and implemented in a number of forms. In certain forms, such features may be provided by configuring one or more integrated circuit-based control units and/or other circuitry to execute instructions stored in one or more non-transitory memory media. The controls described herein are also described as determining or configured to determine one or more values or parameters. It shall be appreciated that such references encompass determinations by a variety of techniques including, for example, calculation, computation, estimation, measuring, sensing, table lookup operations, and combinations of the foregoing and other determination techniques. The controls described herein are also described as predicting or configured to predict one or more values or parameters. It shall be appreciated that such references encompass predictions of values or parameters that may are not directly observable (e.g., because they will occur in the future, even if very shortly in the future, or because measurement of current conditions is not possible or practicable) by a variety of techniques including, for example, calculation, computation, estimation, measuring, sensing, table lookup operations, and combinations of the foregoing and other determination techniques. The controls described herein are also described as accounting for a number of effects. It shall be appreciated that such references encompass operations including adjusting, correcting, modifying, or otherwise determining (directly or indirectly) a parameter or value with improved accuracy or reduced error.)

A number of example embodiments shall now be further described. A first example embodiment is a system comprising: a powertrain including an engine configured to output torque to a driveline; and an electronic control system operatively coupled with the powertrain and configured to determine an engine torque value, the engine torque value accounting for an effect of air-fuel ratio (AFR) on engine torque and an effect of engine acceleration on AFR, and control a component of the driveline in response to the engine torque value.

A second example embodiment includes the features of the first example embodiment wherein the electronic control system is configured to account for the effect of air-fuel ratio (AFR) on engine torque and the effect of engine acceleration on AFR using controls configured to determine an AFR value using an intake air flow value and a commanded fueling value, determine an engine acceleration value, determine an AFR adjustment value using the AFR value and the engine acceleration value, and determine the engine torque value using the AFR adjustment value and a steady state engine torque value.

A third example embodiment includes the features of the second example embodiment wherein a magnitude of the AFR adjustment value is positively correlated with the engine acceleration value.

A fourth example embodiment includes the features of the third example embodiment wherein at least one of: (a) the AFR value is filtered using a first order filter, and (b) the engine acceleration value is filtered using a first order filter.

A fifth example embodiment includes the features of the first example embodiment wherein the accounting for an effect of air-fuel ratio (AFR) on engine torque and an effect of engine acceleration on AFR improves the accuracy of the engine torque value during transient operation of the engine.

A sixth example embodiment includes the features of any of the first through fifth example embodiments wherein the engine torque value further accounts for an effect of transport delay on engine torque.

A seventh example embodiment includes the features of the sixth example embodiment wherein the engine torque value accounts for the effect of transport delay using a filter which filters the engine torque value using a filter constant determined in response to the rate of change in commanded engine fueling and engine speed.

An eighth example embodiment includes the features of any of the first through seventh example embodiments wherein one or both of: (a) the engine torque value further accounts for an effect of powertrain inertia on engine torque, and (b) the system includes an injector configured to inject fuel upstream of the engine's cylinders and the engine torque value further accounts for an effect on engine torque of air-fuel charge mixture transport delay upstream of the engine's cylinders.

A ninth example embodiment includes the features of any of the first through eighth example embodiments wherein the engine torque value is a net brake torque value indicating torque at an interface between the engine and a transmission component.

A tenth example embodiment includes the features of any of the first through ninth example embodiments wherein the electronic control system is further configured to account for of one or more (a) an effect of pumping losses and an effect of an engine temperature on pumping losses, and (b) an effect of one or more of a mechanical load, a hydraulic load, a pneumatic load, and an electrical load on the engine.

A eleventh example embodiment includes the features of any of the first through tenth example embodiments wherein the component of the driveline controlled in response to the engine torque value comprises a clutch.

A twelfth example embodiment is a system comprising: a powertrain including an engine configured to output torque to a driveline; and an electronic control system operatively coupled with the powertrain and configured to determine an engine torque value, the engine torque value accounting for an effect of transport delay on engine torque and effects of a rate of change in commanded fueling and engine speed on transport delay; and control a component of the driveline in response to the engine torque value.

A thirteenth example embodiment includes the features of the twelfth example embodiment wherein the electronic control system is configured to account for the effect of transport delay using controls configured to determine a filter constant in response to engine fueling rate of change and engine speed, and filter a prediction of engine torque using a filter and the filter constant to determine the engine torque value.

A fourteenth example embodiment includes the features of the thirteenth example embodiment wherein the filter is a first order filter.

A fifteenth example embodiment includes the features of any of the twelfth through fourteenth example embodiments wherein the engine torque value further accounts for an effect of air-fuel ratio (AFR) on engine torque.

A sixteenth example embodiment includes the features of any of the twelfth through fifteenth example embodiments wherein the engine torque value further accounts for an effect of powertrain inertia on engine torque.

A seventeenth example embodiment includes the features of any of the twelfth through sixteenth example embodiments wherein the engine torque value is a net brake torque value indicating torque at an interface between the engine and a transmission component.

An eighteenth example embodiment includes the features of any of the twelfth through seventeenth example embodiments wherein one or both of: (a) the electronic control system is further configured to account for an effect of pumping losses and effect of an engine temperature on pumping losses, and (b) the system includes an injector configured to inject fuel upstream of the engine's cylinders and the electronic control system is further configured to account for an effect on engine torque of air-fuel charge mixture transport delay upstream of the engine's cylinders.

A nineteenth example embodiment includes the features of any of the twelfth through eighteenth example embodiments wherein the electronic control system is further configured to account for an effect of one or more of a mechanical load, a hydraulic load, a pneumatic load, and an electrical load on the engine.

A twentieth example embodiment includes the features of any of the twelfth through nineteenth example embodiments wherein the component of the driveline controlled in response to the engine torque value comprises a clutch.

A twenty-first example embodiment is a method comprising: providing a system comprising a powertrain including an engine configured to output torque to a driveline, and an electronic control system operatively coupled with the powertrain; and operating the electronic control system to perform the acts of: determining an engine torque value, the engine torque value accounting for an effect of air-fuel ratio (AFR) on engine torque and an effect of engine acceleration on AFR, and controlling a component of the driveline in response to the engine torque value.

A twenty-second example embodiment includes the features of the twenty-first example embodiment and comprises operating the electronic control system to account for the effect of air-fuel ratio (AFR) on engine torque and an effect of engine acceleration on AFR by determining an AFR value using an intake air flow value and a commanded fueling value, determining an engine acceleration value, determining an AFR adjustment value using the AFR value and the engine acceleration value, and determining the engine torque value using the AFR adjustment value and a steady state engine torque value.

A twenty-third example embodiment includes the features of the twenty-second example embodiment wherein a magnitude of the AFR adjustment value is positively correlated with the engine acceleration value.

A twenty-fourth example embodiment includes the features of the twenty-third example embodiment wherein at least one of: (a) the AFR value is filtered using a first order filter, and (b) the engine acceleration value is filtered using a first order filter.

A twenty-fifth example embodiment includes the features of the twenty-first example embodiment wherein the accounting for an effect of air-fuel ratio (AFR) on engine torque and an effect of engine acceleration on AFR improves the accuracy of the engine torque value during transient operation of the engine.

A twenty-sixth example embodiment includes the features of any of the twenty-first through twenty-fifth example embodiments and comprises operating the electronic control system to account for an effect of transport delay on engine torque.

A twenty-seventh example embodiment includes the features of the twenty-sixth example embodiment wherein the engine torque value accounts for the effect of transport delay using a filter which filters the engine torque value using a filter constant determined in response to the rate of change in commanded engine fueling and engine speed.

A twenty-eighth example embodiment includes the features of any of the twenty-first through twenty-sixth example embodiments and comprises operating the electronic control system to account for an effect of powertrain inertia on engine torque.

A twenty-ninth example embodiment includes the features of any of the twenty-first through twenty-eighth example embodiments wherein the engine torque value is a net brake torque value indicating torque at an interface between the engine and a transmission component.

A thirtieth example embodiment includes the features of any of the twenty-first through twenty-fifth example embodiments and comprises operating the electronic control system to account for of one or more (a) an effect of pumping losses and an effect of an engine temperature on pumping losses, and (b) an effect of one or more of a mechanical load, a hydraulic load, a pneumatic load, and an electrical load on the engine.

A thirty-first example embodiment includes the features of any of the twenty-first through thirtieth example embodiments wherein the component of the driveline controlled in response to the engine torque value comprises a clutch.

A thirty-second example embodiment is a method comprising: providing a system comprising a powertrain including an engine configured to output torque to a driveline, and an electronic control system operatively coupled with the powertrain; and operating the electronic control system to perform the acts of determining an engine torque value, the engine torque value accounting for an effect of transport delay on engine torque and effects a rate of change in commanded fueling and engine speed on transport delay; and controlling a component of the driveline in response to the engine torque value.

A thirty-third example embodiment includes the features of the thirty-second example embodiment and comprises operating the electronic control system to account for the effect of transport delay by determining a filter constant in response to engine fueling rate of change and engine speed, and filtering a prediction of engine torque using a filter and the filter constant to determine the engine torque value.

A thirty-fourth example embodiment includes the features of the thirty-third example embodiment wherein the filtering uses a first order filter.

A thirty-fifth example embodiment includes the features of any of the thirty-second through thirty-fourth example embodiments wherein the engine torque value further accounts for an effect of air-fuel ratio (AFR) on engine torque.

A thirty-sixth example embodiment includes the features of any of the thirty-second through thirty-fifth example embodiments wherein the engine torque value further accounts for an effect of powertrain inertia on engine torque.

A thirty-seventh example embodiment includes the features of any of the thirty-second through thirty-sixth example embodiments wherein the engine torque value is a net brake torque value indicating torque at an interface between the engine and a transmission component.

A thirty-eighth example embodiment includes the features of any of the thirty-second through thirty-seventh example embodiments and comprises operating the electronic control system to account for an effect of pumping losses and an effect of an engine temperature on pumping losses.

A thirty-ninth example embodiment includes the features of any of the thirty-second through thirty-eighth example embodiments and comprises operating the electronic control system to account for an effect of one or more of a mechanical load, a hydraulic load, a pneumatic load, and an electrical load on the engine.

A fortieth example embodiment includes the features of any of the thirty-second through thirty-ninth example embodiments wherein the component of the driveline controlled in response to the engine torque value comprises a clutch.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:
a powertrain including an engine configured to output torque to a driveline; and
an electronic control system operatively coupled with the powertrain and configured to
determine an engine torque value in response to an air-fuel ratio (AFR) parameter and an engine acceleration parameter to account for an effect AFR on engine torque and an effect of engine acceleration on AFR, and
control a component of the driveline in response to the engine torque value.

2. The system of claim 1 wherein the electronic control system is configured to account for the effect of AFR on engine torque and the effect of engine acceleration on AFR using controls configured to
determine an AFR value using an intake air flow value and a commanded fueling value,
determine an engine acceleration value,
determine an AFR adjustment value using the AFR value and the engine acceleration value, and
determine the engine torque value using the AFR adjustment value and a steady state engine torque value.

3. The system of claim 2 wherein a magnitude of the AFR adjustment value is positively correlated with the engine acceleration value.

4. The system of claim 3 wherein at least one of: (a) the AFR value is filtered using a first order filter, and (b) the engine acceleration value is filtered using a first order filter.

5. The system of claim 1 wherein the accounting for an effect of air-fuel ratio (AFR) on engine torque and an effect of engine acceleration on AFR improves the accuracy of the engine torque value during transient operation of the engine.

6. The system of claim 1 wherein the engine torque value further accounts for an effect of transport delay on engine torque.

7. The system of claim 6 wherein the engine torque value accounts for the effect of transport delay using a filter which filters the engine torque value using a filter constant determined in response to a rate of change in commanded engine fueling and engine speed.

8. The system of claim 1 wherein one or both of:
 (a) the engine torque value further accounts for an effect of powertrain inertia on engine torque, and
 (b) the system includes an injector configured to inject fuel upstream of a plurality of cylinders of the engine and the engine torque value further accounts for an effect on engine torque of air-fuel charge mixture transport delay upstream of the engine's cylinders.

9. The system of claim 1 wherein the engine torque value is a net brake torque value indicating torque at an interface between the engine and a transmission component.

10. The system of claim 1 wherein the electronic control system is further configured to account for of one or more (a) an effect of pumping losses and an effect of an engine temperature on pumping losses, and (b) an effect of one or more of a mechanical load, a hydraulic load, a pneumatic load, and an electrical load on the engine.

11. A method comprising:
 providing a system comprising a powertrain including an engine configured to output torque to a driveline, and an electronic control system operatively coupled with the powertrain; and
 operating the electronic control system to perform the acts of:
 determining an engine torque value in response to an air-fuel ratio (AFR) parameter and an engine acceleration parameter to account for an effect of AFR on engine torque and an effect of engine acceleration on AFR, and
 controlling a component of the driveline in response to the engine torque value.

12. The method of claim 11 comprising operating the electronic control system to account for the effect of AFR on engine torque and an effect of engine acceleration on AFR by
 determining an AFR value using an intake air flow value and a commanded fueling value,
 determining an engine acceleration value,
 determining an AFR adjustment value using the AFR value and the engine acceleration value, and
 determining the engine torque value using the AFR adjustment value and a steady state engine torque value.

13. The method of claim 12 wherein a magnitude of the AFR adjustment value is positively correlated with the engine acceleration value.

14. The method of claim 13 wherein at least one of: (a) the AFR value is filtered using a first order filter, and (b) the engine acceleration value is filtered using a first order filter.

15. The method of claim 11 wherein the accounting for an effect of air-fuel ratio (AFR) on engine torque and an effect of engine acceleration on AFR improves the accuracy of the engine torque value during transient operation of the engine.

16. The method of claim 11 comprising operating the electronic control system to account for an effect of transport delay on engine torque.

17. The method of claim 16 wherein the engine torque value accounts for the effect of transport delay using a filter which filters the engine torque value using a filter constant determined in response to the rate of change in commanded engine fueling and engine speed.

18. The method of claim 11 comprising operating the electronic control system to account for an effect of powertrain inertia on engine torque.

19. The method of claim 11 wherein the engine torque value is a net brake torque value indicating torque at an interface between the engine and a transmission component.

20. The method of-claim 11 comprising operating the electronic control system to account for of one or more (a) an effect of pumping losses and an effect of an engine temperature on pumping losses, and (b) an effect of one or more of a mechanical load, a hydraulic load, a pneumatic load, and an electrical load on the engine.

* * * * *